UNITED STATES PATENT OFFICE.

SAMUEL G. SUPPLEE, OF EAST ORANGE, NEW JERSEY, AND CHARLES J. R. ENGSTROM, OF LOS ANGELES, CALIFORNIA.

DENTAL RUBBER COMPOSITION AND ART OF MANUFACTURE.

1,204,609.  Specification of Letters Patent.  Patented Nov. 14, 1916.

No Drawing.  Application filed February 19, 1916. Serial No. 79,267.

*To all whom it may concern:*

Be it known that we, SAMUEL G. SUPPLEE and CHARLES J. R. ENGSTROM, citizens of the United States of America, residing, respectively, at East Orange, New Jersey, and Los Angeles, California, have invented a new and useful Dental Rubber Composition and Art of Manufacture, of which the following is a specification.

One form of dental plate is commonly made of gum rubber of suitable composition vulcanized so as to be relatively hard and dense. During the vulcanizing process the rubber first expands during the earlier stages of vulcanizing and then shrinks during the later stages of vulcanization. This makes it difficult to produce accurate and satisfactory results owing to the warping of the plate and alterations in dimensions. Unless the work is very skilfully done the plate will not fit and causes great discomfort and nervous disturbances to the wearer.

It is our object to provide a composition and method of manufacture which will enable ordinary operators to produce accurate and satisfactory work with a minimum amount of difficulty.

According to our invention we mix a finely divided previously vulcanized dental rubber with ordinary unvulcanized dental gum rubber and then form the plate of this composition. The previously vulcanized rubber may be either in a powdered or in slightly fibrous form but preferably in relatively small particles. The gum rubber may be of a composition suitable for the conditions to be met with in manufacture and use.

The proportions between the parts may be varied in individual cases and will depend somewhat upon the composition of the previously vulcanized and unvulcanized ingredients. The unvulcanized gum rubber and the finely divided previously vulcanized rubber are intimately mixed together so as to distribute the vulcanized particles as uniformly as possible throughout the mass of the unvulcanized gum and form a plastic, readily workable composition.

The composition and proportions of the parts and the time of vulcanizing are all so arranged that the expansion of the gum rubber during the early stages of vulcanization will be off-set by the simultaneous shrinkage of the previously vulcanized rubber. In this way we take advantage of the properties of the rubber and the expansion and shrinkage phenomena so that the plate will not be warped but will be of the proper size when finished and without requiring the extremely nice attention to proportion, time and heat necessary under previous processes. The process requires less time in vulcanizing a heavy plate than ordinary processes as part of the material has already been vulcanized.

The plate formed by our process consists of a homogeneous mass of rubber which is much denser or less porous than ordinary rubber plates.

We believe the composition as set forth to be new as an article of manufacture suitable for distribution and sale and we also claim the finished plate and the process of manufacturing the same.

We claim:—

1. The plastic composition herein set forth suitable for making dental plates and the like and consisting of unvulcanized gum rubber and finely divided previously vulcanized rubber intimately mixed therewith to provide properties of counterbalancing expansion and shrinkage during ultimate vulcanization.

2. The process of forming a dental plate which comprises first vulcanizing gum rubber, second finely dividing the said vulcanized rubber, third mixing the finely divided vulcanized rubber with unvulcanized rubber and fourth vulcanizing the mixture to produce the finished plate whereby the expansion of the one ingredient is off-set by the shrinkage of the other ingredient during the final vulcanization.

3. The process of forming a dental plate which comprises mixing a finely divided vulcanized rubber with unvulcanized gum rubber, shaping the composition and vulcanizing the same so that the expansion of the one ingredient is counteracted by the shrinkage of the other ingredient.

4. A vulcanized rubber dental plate formed of a composition of finely divided previously vulcanized rubber and unvulcanized gum rubber formed substantially as herein described.

SAML. G. SUPPLEE.
CHARLES J. R. ENGSTROM.